United States Patent

Suchowski

[11] Patent Number: 5,443,039
[45] Date of Patent: Aug. 22, 1995

[54] RELEASABLE CAT COLLAR

[75] Inventor: Bernard Suchowski, Marlboro, N.J.

[73] Assignee: The Hartz Mountain Corp., Harrison, N.J.

[21] Appl. No.: 357,061

[22] Filed: Dec. 14, 1994

Related U.S. Application Data

[63] Continuation of Ser. No. 192,169, Feb. 4, 1994, abandoned.

[51] Int. Cl.⁶ ............................................. A01K 27/00
[52] U.S. Cl. ..................................... 119/865; 24/625; 119/792
[58] Field of Search ............. 119/863, 864, 865, 792, 119/793; 24/115 F, 662, 681, 628, 602

[56] References Cited

U.S. PATENT DOCUMENTS

| 394,506 | 12/1888 | Riley | 119/863 |
| 1,425,153 | 8/1922 | Vigneault | 24/625 |
| 2,612,139 | 9/1952 | Collins | 119/865 |
| 4,031,859 | 6/1977 | Stewart | 119/865 |
| 4,180,016 | 12/1979 | George | 119/865 |
| 4,186,690 | 2/1980 | Seiler | 24/115 F |
| 4,712,280 | 12/1987 | Fildan | 24/625 |
| 4,881,492 | 11/1989 | Jones | 119/865 |
| 4,917,049 | 4/1990 | Peterson | 119/865 |
| 5,027,477 | 7/1991 | Seron | 119/865 |

FOREIGN PATENT DOCUMENTS

| 205132 | 5/1993 | Taiwan . | |
| 2227400 | 8/1990 | United Kingdom | 119/865 |

Primary Examiner—Paul J. Hirsch
Attorney, Agent, or Firm—Kuhn and Muller

[57] ABSTRACT

The present invention is directed toward a collar for a cat, which is releasable if the collar is caught on a dangerous protrusion, such as a tree branch or fence portion, thereby preventing accidental choking of the cat. The collar includes a receptacle buckle with an interior rounded tongue snap portion engageable with a corresponding rounded forked element. The rounded forked element is adapted to receive the rounded tongue snap portion to lock the buckle in place upon the neck of the cat. The forked element of the collar is separated from the receptacle when the cat exerts above normal tensional forces upon the collar, such as when trying to free itself from an obstruction caught in the collar.

5 Claims, 3 Drawing Sheets

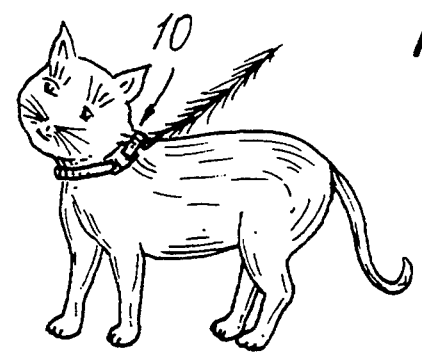
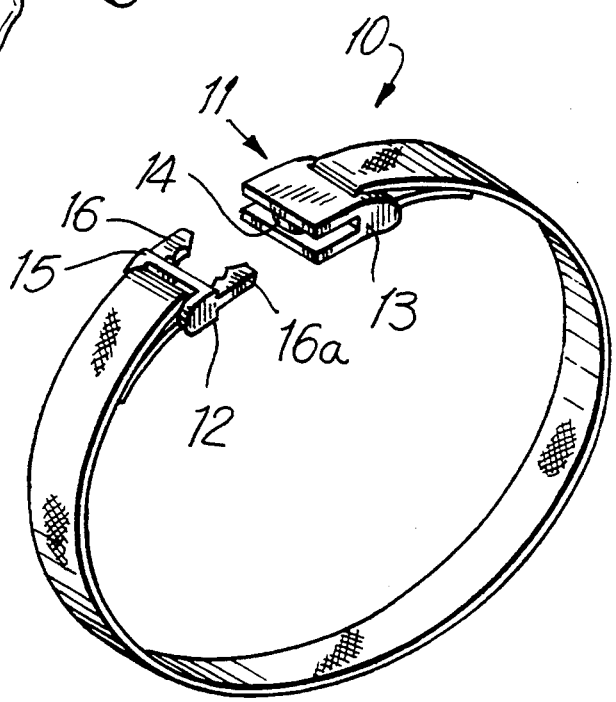
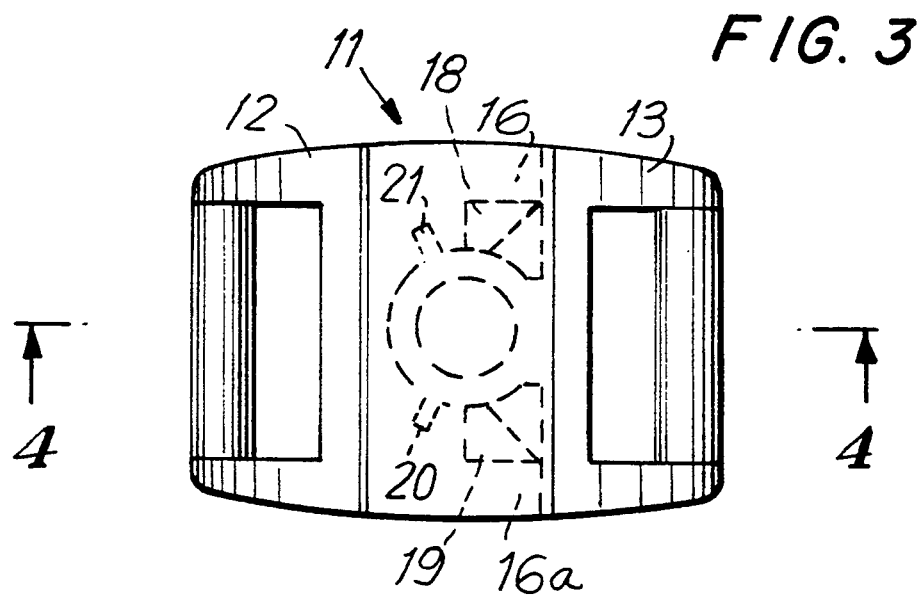

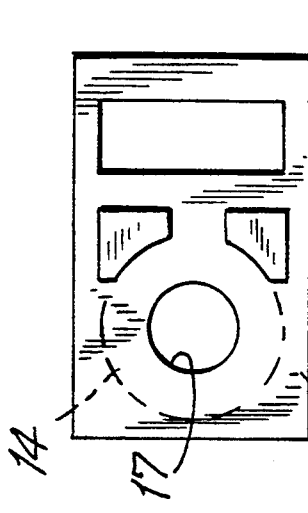
FIG. 7
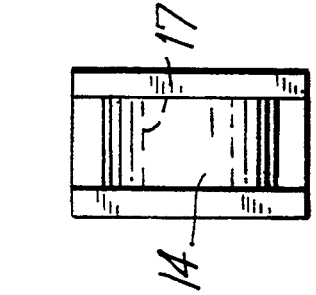
FIG. 8
FIG. 9
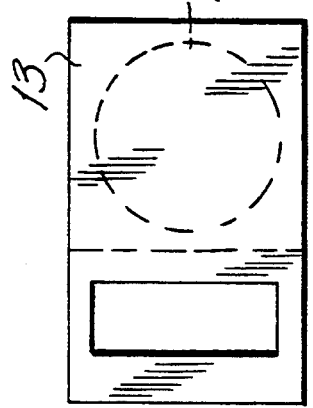
FIG. 10
FIG. 11
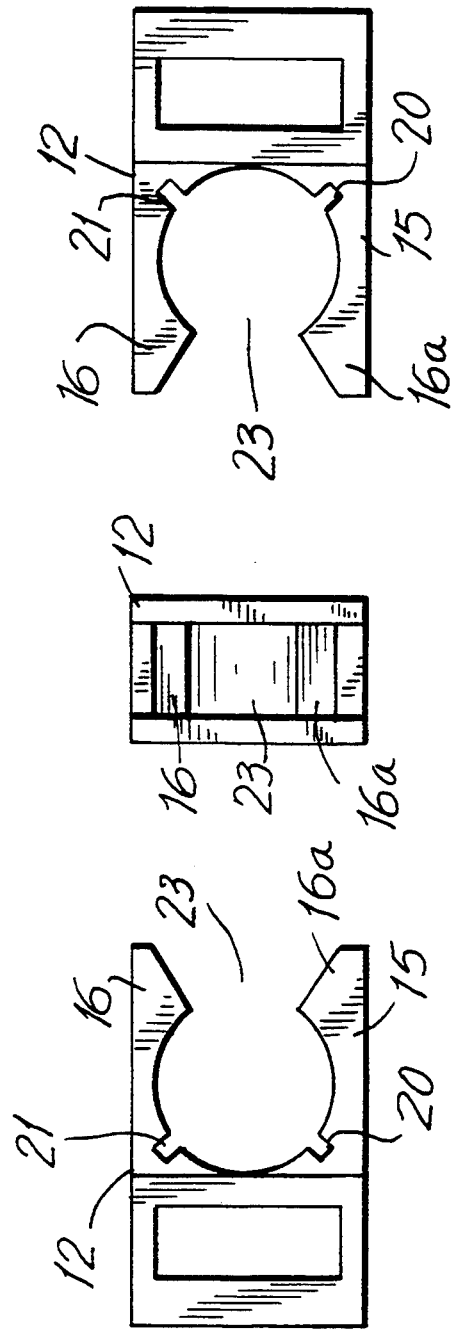
FIG. 12

RELEASABLE CAT COLLAR

This application is a continuation of application Ser. No. 08/192,169, filed Feb. 4, 1994, now abandoned.

FIELD OF THE INVENTION

The present invention is directed toward a collar for a cat, which is releasable if the collar is caught on a dangerous protrusion, such as a tree branch or fence portion, thereby preventing accidental choking of the cat.

The collar includes a receptacle buckle with a female portion having therein an interior rounded tongue snap portion. The buckle further has a male portion having a pair of corresponding forked elements spaced apart from each other. The forked elements of the male portion are insertable within the female portion. However, the forked elements have a rounded gap therebetween, which gap is adapted to receive the rounded tongue snap portion of the female portion of the buckle, to lock the buckle in place upon the neck of the cat.

The forked elements of the collar are separated from the female receptacle portion when the cat exerts above normal tensional forces upon the collar, such as when trying to free itself from an obstruction caught in the collar.

BACKGROUND OF THE INVENTION

Several prior patents describe releasable animal collars directed toward similar subject matter in that they use a releasable pin removably attachable within a buckle receptacle.

However, they do not specifically address the configuration for the buckle of the present invention.

The prior art patents include those with pins which are released from receptacles upon the exertion of above normal tensional forces by the animal upon the collar. Among these patents include U.S. Pat. Nos. 2,612,139 of Collins and 4,044,725 of Miller which both include an adjustable, releasable link including a knob insertable within a spherical receptacle. In addition, U.S. Pat. Nos. 3,540,089 of Franklin and 3,994,265 of Banks describe releasable ball and receptacle tethers. U.S. Pat. No. 4,180,016 of George and British patent application GB22274000A disclose receptacles within which the free ends of the collar straps are inserted. U.S. Pat. Nos. 5,027,477 of Seron and 4,881,492 of Jones and Australian Pat. No. 220,897 disclose flat expandable forked pins engageable within receptacles. Moreover, U.S. Pat. No. 2,900,696 of Bacon discloses a male section with winged projections, insertable within a receptacle with detents.

However, none of the prior art patents describe a two piece buckle having a male portion insertable within a female portion, wherein the female portion has an interior rounded tongue portion which is further insertable within a rounded gap between two extending forked elements of the male portion of the collar.

OBJECTS OF THE INVENTION

An object of the present invention is to provide a collar for a cat, which is releasable if the collar is caught on a dangerous protrusion, such as a tree branch or fence portion, thereby preventing accidental choking of the cat.

It is a further object of the present invention to provide a pet collar which includes a receptacle buckle with an interior rounded tongue snap portion engageable with a corresponding rounded forked element. It is a further object to provide a rounded forked element adapted to receive the rounded tongue snap portion to lock the buckle in place upon the neck of the cat.

It is a further object to provide a forked element of the collar which is separatable from the receptacle when the cat exerts above normal tensional forces upon the collar, such as when trying to free itself from an obstruction caught in the collar.

It is a further object to improve upon the disadvantages of the prior art.

DESCRIPTION OF THE DRAWINGS

FIG. 1 is a perspective view of the buckle of the present invention, shown as worn by a pet cat.

FIG. 2 is a perspective view of the buckle as in FIG. 1, showing both halves of the buckle in an open position.

FIG. 3 is a top plan view of the buckle as in FIG. 1, in a closed position.

FIG. 7 is a top plan view of the female portion of the buckle.

FIG. 8 is an end view of the female portion of the buckle.

FIG. 9 is a bottom view of the female portion of the buckle.

FIG. 10 is a top plan view of the male portion of the buckle.

FIG. 11 is an end view of the male portion of the buckle.

FIG. 12 is a bottom view of the male portion of the buckle.

DETAILED DESCRIPTION OF THE PREFERRED EMBODIMENTS

Figure 4:
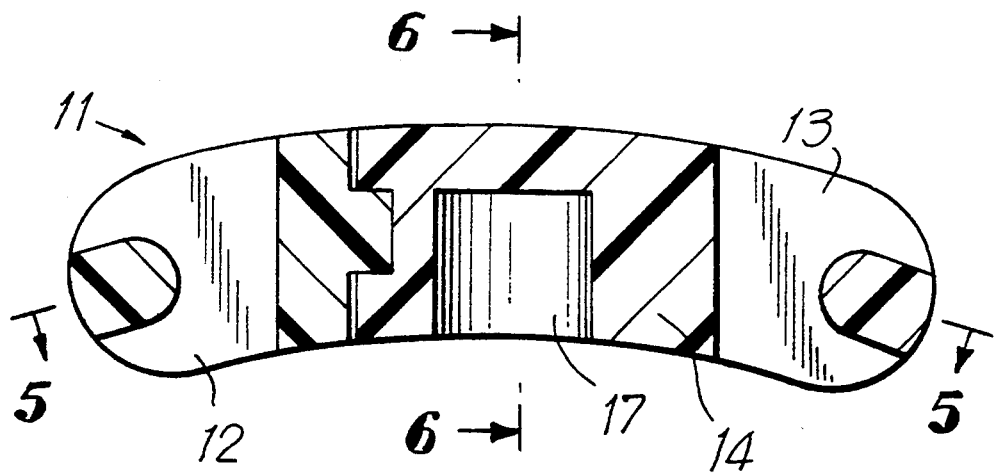
FIG. 4 is a cross sectional view of the buckle, taken along lines 4—4 of FIG. 3.
Figure 5:
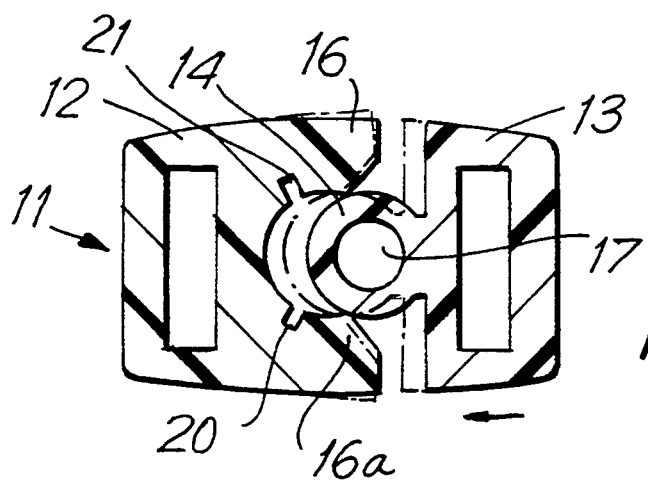
FIG. 5 is a top cross sectional view of the buckle, taken along lines 5–5 of FIG. 4, in a partially unbuckled position.
Figure 6:
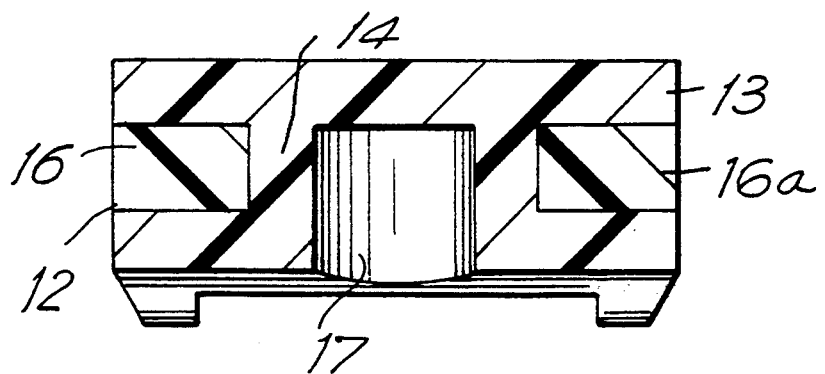
FIG. 6 is a cross sectional view of the female portion of the buckle, taken along lines 6–6 of FIG. 4.

The present invention includes collar 10 for a cat, which collar 10 is releasable if collar 10 is caught upon a dangerous protrusion, such as a tree branch or fence portion, thereby preventing accidental choking of the cat.

Collar 10 includes strap 10a attached at both ends to receptacle buckle 11, wherein buckle 11 includes male portion 12 engageable within female portion 13. Within female portion 13 there is provided interior rounded tongue snap protrusion portion 14, engageable within gap 23 within corresponding rounded forked element 15 of male portion 12. As shown in FIG. 2, female portion 13 includes top cantilevered ledge portion 13a and lower cantilevered ledge portion 13b providing a covered recess within which recess 13c there is provided interior rounded tongue snap protrusion 14″. Rounded forked element 15 is adapted to receive rounded tongue snap portion 14 to lock buckle 11 in place upon the neck of the cat. Forked element 15 of male portion 12 includes expandable prongs 16, 16a, between which prongs 16, 16a is inserted rounded tongue protrusion portion 14 of female portion 13.

Prongs 16, 16a of forked element 15 of male portion 12 of collar 10 are separated from rounded tongue snap portion 14 of female portion 13 of buckle/receptacle 11 when the cat exerts above normal tensional forces upon collar 10, such as when trying to free itself from an obstruction caught in strap 10a of collar 10.

Buckle 11 may be alternately provided with round hole 17, which hole 17 is located in concave back 18 of female half 13 of buckle 11. Round hole 17 is positioned off center between two further openings 18, 19 on each side of hole 17, which further openings 18, 19 are used optionally for the purpose of molding collar 10. However, collar 10 can also be molded without hole 17 and openings 18, 19.

Prongs 16, 16A of forked element 15 of male part 12 expand outward to go over and lock onto rounded tongue snap portion 14 of female portion 13 of buckle 11. To facilitate smooth expansion and locking of prongs 16, 16A of forked element 15 of male portion 12, male portion 12 is provided with small recesses 20, 21, which recesses 20, 21 are located upon inner concave surface 22 of male portion 12 at respective locations where prongs 16, 16A extend outward from male portion 12. Recesses 20, 21 allow the adjustment in buckle 11 for the tension of the snap operation of male portion 12 within female portion 13.

In operation, male portion 12 acts as a female portion itself, by providing round recess gap 23 between prongs 16, 16A, in which recess 23 is inserted rounded tongue portion 14 of female portion 13. Likewise, female portion 13 acts as a male portion, by virtue of rounded tongue portion 14 being insertable within recess 23 of male portion 12.

It is noted that other modifications may be made to the present invention without departing from the spirit and scope of the invention, as noted in the appended claims.

I claim:

1. A collar for a cat when trying to free itself from an obstruction caught in the collar, which collar is releasable if the collar is caught on a dangerous protrusion, such as a tree branch or fence portion, thereby preventing accidental choking of the cat;

said collar comprising a receptacle buckle having a male portion insertable within a female portion, said female portion having a top cantilevered ledge portion and a lower cantilevered ledge portion bearing a covered recess therebetween, said female portion having therein an interior rounded tongue snap portion within said covered recess, said interior rounded tongue snap portion engageable between corresponding prongs of a forked element of said male portion, said forked element adapted to receive said rounded tongue snap portion within said covered recess to lock said buckle in place upon the neck of the cat;

said forked element of said collar separable from said receptacle when the cat exerts above normal tensional forces upon said collar.

2. The cat collar as in claim 1, further comprising a round hole, disposed upon said lower cantilevered ledge portion of said female portion of said buckle, said round hole and the two openings being on each side for molding said buckle.

3. The cat collar as in claim 1, wherein said forked element of said male portion expands over and locks onto said rounded tongue snap portion of said female portion of said buckle.

4. A collar for a pet, such as a cat, comprising:

a longitudinally extending collar strap having a first end and a second end, a buckle connecting said first end and said second end of said strap of said collar, said buckle being releasable, said buckle having a female portion engageable with a male portion, said female portion having a top cantilevered ledge portion, a lower cantilevered ledge portion and a covered recess therebetween;

said male portion having a pair of outwardly extending prongs engageable with said female portion, within said covered recess between said top cantilevered ledge portion and said lower cantilevered ledge portion;

said male portion having a forked element, said forked element having a further recess between said prongs, each of said prongs being in spaced relation from each other of said prongs, said covered recess having a rounded tongue protrusion portion therein, said rounded tongue protrusion portion of said female portion releasably insertable within said further recess between said prongs of said forked element of said male portion of said buckle of said collar.

5. The collar as in claim 4, further comprising: a means for adjusting of tension of said male portion of said buckle, said means comprising:

said male portion having an inner concave surface between said outwardly extending prongs, said inner concave surface having a small recess at each location upon said concave surface from which each said prongs extend outward.

* * * * *